(12) United States Patent
Stumpf et al.

(10) Patent No.: US 10,091,183 B2
(45) Date of Patent: Oct. 2, 2018

(54) METHOD AND DECISION GATEWAY FOR AUTHORIZING A FUNCTION OF AN EMBEDDED CONTROL UNIT

(71) Applicant: Robert Bosch GmbH, Stuttgart (DE)

(72) Inventors: Frederic Stumpf, Leonberg (DE); Jan Holle, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 290 days.

(21) Appl. No.: 15/146,724

(22) Filed: May 4, 2016

(65) Prior Publication Data
US 2016/0344704 A1 Nov. 24, 2016

(30) Foreign Application Priority Data

May 19, 2015 (DE) .......... 10 2015 209 108

(51) Int. Cl.
*H04L 29/06* (2006.01)
*H04L 29/08* (2006.01)
*G07C 5/00* (2006.01)

(52) U.S. Cl.
CPC .......... *H04L 63/0807* (2013.01); *G07C 5/008* (2013.01); *H04L 63/0428* (2013.01); *H04L 63/08* (2013.01); *H04L 63/10* (2013.01); *H04L 63/12* (2013.01); *H04L 67/12* (2013.01); *H04L 63/166* (2013.01)

(58) Field of Classification Search
CPC ....... G07C 5/008; H04L 9/321–9/3213; H04L 9/3234; H04L 9/3247–9/3257; H04L 63/0428; H04L 63/08–63/0823; H04L 63/0853; H04L 63/10; H04L 63/12–63/126; H04L 67/12

See application file for complete search history.

(56) References Cited

U.S. PATENT DOCUMENTS

| | | | |
|---|---|---|---|
| 8,312,272 B1 * | 11/2012 | Serenyi | G06F 21/33 713/168 |
| 8,856,536 B2 | 10/2014 | Rabadi et al. | |
| 2009/0106834 A1 * | 4/2009 | Borzycki | H04L 63/166 726/21 |
| 2013/0326606 A1 * | 12/2013 | Kelly | H04L 9/3228 726/7 |

* cited by examiner

*Primary Examiner* — Kevin Bechtel
(74) *Attorney, Agent, or Firm* — Norton Rose Fulbright US LLP; Gerard Messina

(57) ABSTRACT

A method for authorizing a function of an embedded electronic control unit, including: a decision gateway requests from a hardware security module a function request destined for the electronic control unit, the decision gateway receives from the hardware security module the function request which is signed by the hardware security module, the decision gateway creates a communication channel, based on a cryptographic identity of the decision gateway, to a backend, the decision gateway sends the function request to the backend, the decision gateway receives from the backend via the communication channel a ticket which corresponds to the function request and is signed by the backend, and the decision gateway stores the ticket.

14 Claims, 4 Drawing Sheets

METHOD AND DECISION GATEWAY FOR AUTHORIZING A FUNCTION OF AN EMBEDDED CONTROL UNIT

CROSS REFERENCE

The present application claims the benefit under 35 U.S.C. § 119 of German Patent Application No. DE 102015209108.2 filed on May 19, 2015, which is expressly incorporated herein by reference in its entirety.

FIELD

The present invention relates to a method for authorizing a function of an embedded control unit (electronic control unit, ECU). Moreover, the present invention relates to a corresponding decision gateway, a corresponding computer program, and a corresponding memory medium.

BACKGROUND INFORMATION

A diagnostic communication protocol used in automotive electronics for unified diagnostic services (UDS) is specified according to the ISO 14229 international standard. These types of diagnostic services allow contacting and maintenance of various control units in a vehicle, with involvement of the session layer and application layer of a field bus system. A vehicle equipped in this way generally includes a diagnostic interface for the so-called on-board diagnosis, which allows a client, referred to as a diagnostic tester, to be connected to the field bus system. It is thus possible, for example, to query the error memory of individual control units or update them with new firmware.

U.S. Pat. No. 8,856,536 B2 describes a method for authenticating a piece of firmware which is to be downloaded to a controller. The method includes signing the firmware or a first part of the firmware with a first private key at a first trusted source and signing the firmware or a second part of the firmware with a second private key at a second trusted source. The method also includes validating the signed firmware or the first part of the firmware using a first public key at the controller and validating the firmware or the second part of the firmware using a second public key at the controller. The method further includes authenticating the firmware if the firmware or the first part of the firmware is validated by the first public key at the controller, and the firmware or the second part of the firmware is validated by the second public key at the controller.

The authorization of such accesses to the electronic control unit has sometimes proven to be problematic. This challenge arises not only for the update, but also generally in the use of various functions of the electronic control unit which require appropriate enabling or permission.

SUMMARY

The present invention provides a method for authorizing a function of an embedded electronic control unit, a corresponding decision gateway, a corresponding computer program, and a corresponding memory medium.

The approach in accordance with an example embodiment of the present invention allows a functional activation of deeply embedded control units in a secure manner without an active dialogue with the backend of an original equipment manufacturer (OEM).

The provided approach prevents tickets or the enabling of functions from being used multiple times. This is achieved by a ticket-based mechanism which invalidates the ticket after it has been used by a trusted entity such as a hardware security module (HSM). Another aspect of the present invention is that the ticket is cryptographically signed and therefore cannot be counterfeited.

Supplementing the method with a hardware security module provides a trust anchor in which crucial functions may be completely and securely carried out. This trust anchor stores the necessary material for activating a certain function on an electronic control unit. This has the advantage that no specific hardware is necessary on the electronic control units.

In accordance with the present invention, it may be provided that a certain vehicle and its configuration are uniquely characterized by a cryptographic identity which is securely stored within the hardware security module. By use of this unique identity, the decision gateway may now be authenticated with respect to the vehicle backend by utilizing security protocols such as transport layer security (TLS).

According to another aspect, it may be provided to create a secure channel between the hardware security module and the electronic control unit. This allows the decision enabling to be securely delivered even though the decision gateway has been compromised by an attacker. This is equivalent to tunneling of the decision gateway. As a result, an attacker is not able to activate a function by making unauthorized changes to the electronic control unit.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
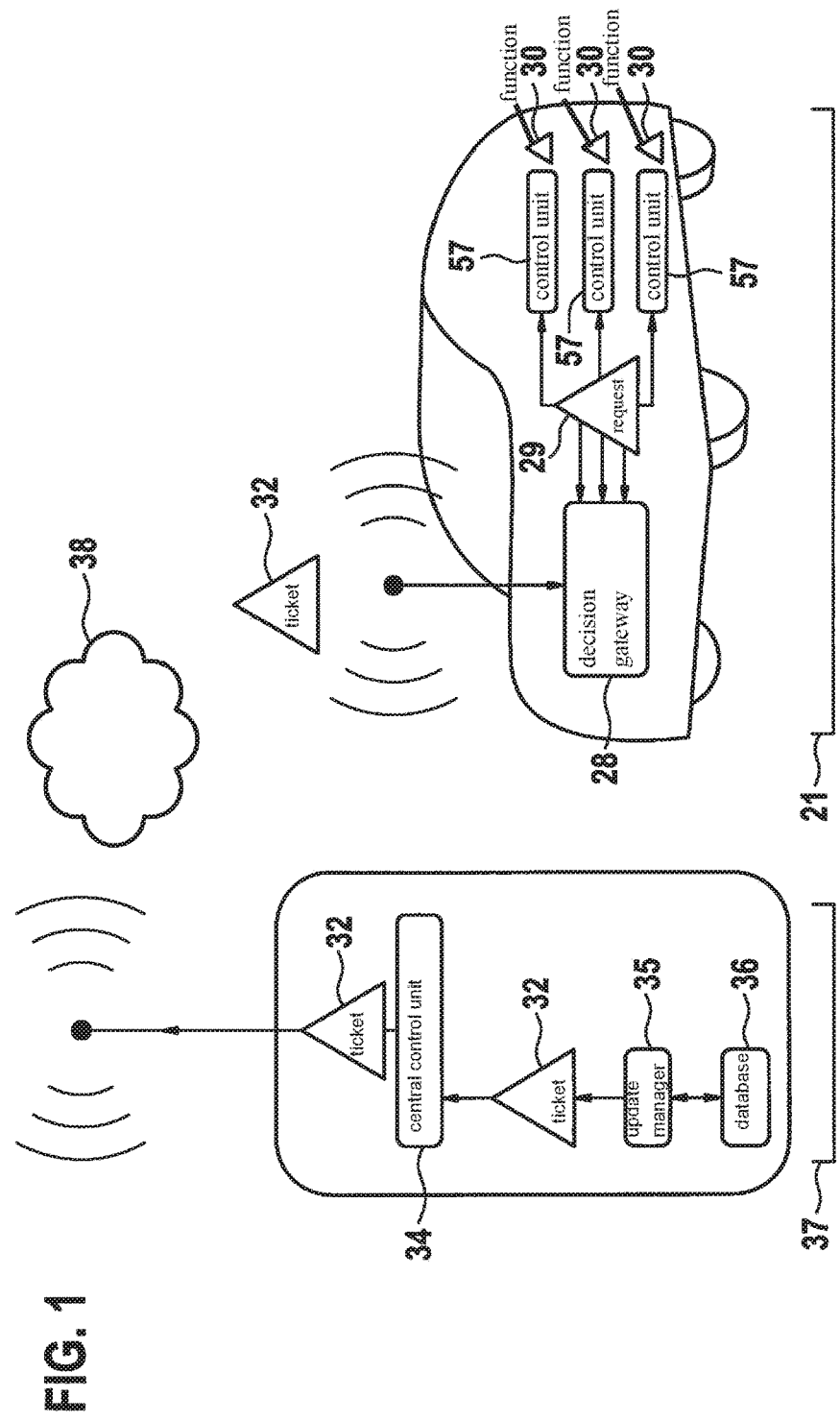
FIG. 1 shows an overview of the system landscape underlying one specific embodiment.

FIG. 1 provides an overview of the system landscape underlying one specific embodiment, whose components are described below.

Backend 37 is typically controlled by the original equipment manufacturer, and with the aid of an update manager 35 manages a database 36 which links the identity of a vehicle 21 to a certain vehicle configuration. Database 36 is appropriately updated whenever the configuration of vehicle 21 changes, for example when a control unit 57 is replaced or a software update is installed.

Control units 57 of vehicle 21 request 29 enabling for utilizing a certain function 30 by controlling decision gateway 28. Decision gateway 28 may request from a central control unit 34 of backend 37 via cloud 38 a ticket 32 for utilizing function 30.

Figure 2:
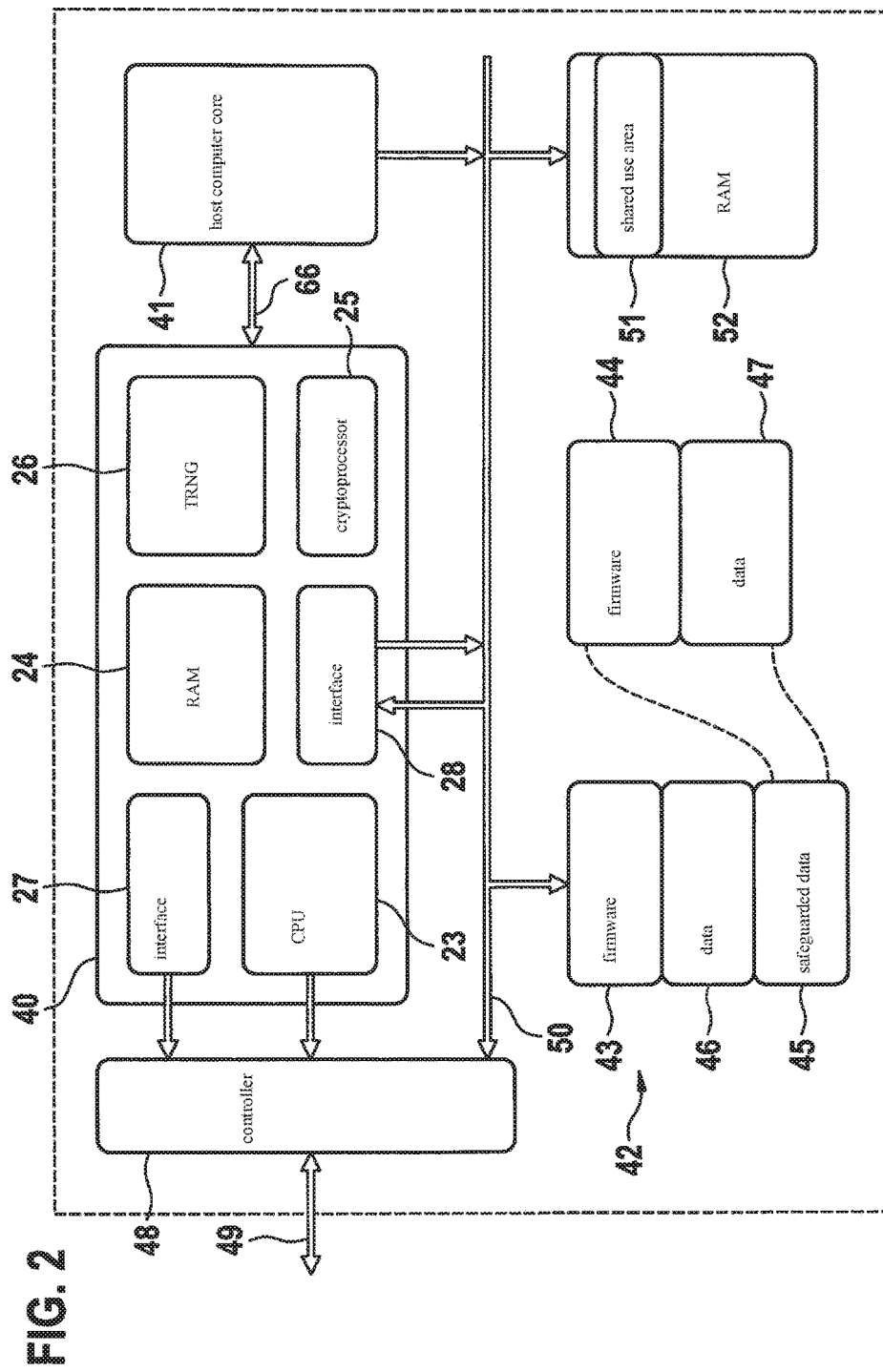
FIG. 2 shows the architecture of a hardware security module.

FIG. 2 shows the basic architecture of a hardware security module 40 used within the scope of one specific embodiment of the present invention. The core of hardware security module 40 is a safeguarded central processing unit (CPU) 23 on which security-critical tasks are executed. Hardware security module 40 also includes a dedicated random access memory (RAM) 24, a bootstrap read-only memory (boot ROM), a cryptoprocessor for advanced encryption standard (AES) 25, and a physical true random number generator (TRNG) 26 as a cryptographic periphery. In addition, the hardware security module may include further cryptographic peripheries such as ECC or RSA accelerators (not shown in the illustration). Also part of hardware security module 40 are interfaces 27 for debugging and an on-chip connection interface 28 (network on a chip, NoC), which are utilized for data communication 50 with processor core 41 of the host computer, which is accessible by interrupt request (IRQ) 66 via shared-use area 51 of system random access memory 52, and for access to flash memory 42 (flash electrically erasable programmable read-only memory (flash EEPROM)). Host computer core 41 is a typical application processor, suitable for vehicles, which provides an execution environment for security-critical tasks, which may be achieved with the aid of additional lockstep cores, for example. Flash memory 42 is divided between host computer core 41 and hardware security module 40, and firmware 43 of hardware security module 40 and firmware 44 of host computer core 41 are stored together with associated data 46 or 47, respectively, in shared-use flash memory 42. A memory protection unit (MPU), not shown in the illustration, ensures that only hardware security module 40 is granted access to the data which are safeguarded 45 in flash memory 42 and allocated to the hardware security module itself. While hardware security module 40 is booted up, the local start code is loaded from the bootstrap read-only memory, and the code stored in shared-use flash memory 42 is pre-assigned to hardware security module 40.

Hardware security module 40 assists with a process for eliminating program errors of hardware security module 40 via a security access 49 with the aid of an appropriate controller 48, which includes reading out all data stored in flash memory 42 and the internal data of hardware security module 40, except for internal AES keys. The debugging interface may be activated only internally by hardware security module 40, after a safeguarded authentication protocol based, for example, on an authentication request, including a challenge and response, between hardware security module 40 and an external debugger has been followed.

Decision gateway 28 in vehicle 21 is equipped with a hardware security module 40 on which an asymmetrical cryptographic identity for identifying and authenticating a certain decision gateway 28 is stored. This cryptographic identity is created by the original equipment manufacturer during the vehicle manufacture, and identifies a certain decision gateway 28 having a certain vehicle configuration. In this context, "vehicle configuration" is understood to mean a set of different control units which include a certain installed software version and a certain installed set of functional features.

The cryptographic identity of decision gateway 28 is made up of the following components: a secret key $K_{DG}^{-1}$ known only to hardware security module 40, a public key $K_{DG}$, associated with secret key $K_{DG}^{-1}$, for encrypting data or validating signatures, and a certificate Cert($K_{DG}$) of public key $K_{DG}$ which is issued by a trusted entity such as the vehicle manufacturer, together with further information concerning vehicle 21 for identifying the configuration of vehicle 21, such as the vehicle identification number, vehicle platform, or control unit configuration.

In addition to cryptographic identity ($K_{DG}^{-1}$, $K_{DG}$, Cert($K_{DG}$)), decision gateway 28 stores public key $K_{backend}$ or the certificate of backend 37 which is linked via the air interface (over the air (OTA)). This cryptographic identity is referred to below as Cert($K_{backend}$).

During manufacture of the vehicle, cryptographic identity ($K_{DG}^{-1}$, $K_{DG}$, Cert($K_{DG}$)) of decision gateway 28 is applied or created by the vehicle manufacturer, and is securely certified by signature key $K_{OEM}^{-1}$ of the original equipment manufacturer in order to ensure a safeguarded, trusted vehicle configuration. It is not absolutely necessary to transmit Cert($K_{DG}$) to OTA backend 37, provided that OTA backend 37 trusts signature key $K_{OEM}^{-1}$ of the original equipment manufacturer.

Before transfer of a certain ticket 32 in order to activate a particular feature or a particular function 30 of electronic control unit 57, decision gateway 28 and OTA backend 37 create a mutually authenticated, safeguarded communication channel, which is based on $K_{DG}$ and $K_{backend}$, for example, with the aid of transport layer security. This communication channel ensures that both entities have been properly authenticated and a cryptographic session key has been specified in order to transmit ticket 32 and any update data in a protected manner. After a safeguarded communication channel has been applied, ticket 32, together with a certain software component which, if not yet installed on electronic control unit 57, implements certain function 30 on electronic control unit 57, may also be transferred in order to utilize a certain function 30.

Ticket 32 is signed with a signature key $K_{ticket}^{-1}$ which is managed in backend 37 and utilized for authenticating valid tickets 32. Public key $K_{ticket}^{-1}$ is known to hardware security module 40, and may also be signed with $K_{backend}^{-1}$ 37 in order to embed it in the certificate hierarchy and simplify the verification operation. The validity of ticket 32 is verified by hardware security module 40 as a trust anchor, which is presumed to be reliable since it is hardened against physical attacks. Ticket 32 may be temporarily stored on decision gateway 28, and does not have to be used immediately. Part of ticket 32 is a random number, provided by hardware security module 40, which in a manner of speaking ensures the "freshness" of ticket 32.

Ticket 32 has the following overall properties: the number of its uses is limited, and it is cryptographically bound to a certain function 30 of an electronic control unit 57, cryptographically bound to a certain decision gateway 28, and generated by backend 37 in a protected manner.

Ticket 32 includes a consecutive number "serialNo" of ticket 32, a public key $K_{DG}$ which denotes hardware security module 40 or decision gateway 28, random number $N_1$ of hardware security module 40, pieces of information $ID_{ECU}$ concerning electronic control unit 57, optional pieces of information $SW_{version}$ concerning the software version if function 30 is not installed on electronic control unit 57, an optional reference to the software, for example in the form of a cryptographic fingerprint $SW_{reference}$, a cryptographic key which is encrypted with the public key of hardware security module 40 (only needed if the functional feature is preinstalled and encrypted on electronic control unit 57) in order to decrypt a certain functional feature on an electronic control unit 57, a counter or other pieces of information "run time" concerning the run time of ticket 32, and a cryptographic signature of ticket 32 with $K_{ticket}^{-1}$.

This ticket 32 is then transferred to hardware security module 40, which may activate a certain functional feature of electronic control unit 57 if requested by electronic control unit 57. Nonetheless, it should be noted that decision gateway 28 may also actively activate function 30 by initiating the feature activation process. In the discussion below, it is assumed that for this purpose, hardware security module 40 stores all necessary information for activating security access 49, i.e., the necessary credentials for responding to the authentication requests from electronic control units 57. For example, a seed+key method, or more complex, advanced mechanisms based on asymmetrical or symmetrical cryptography in which a random number is directly authenticated, may be considered. This is necessary only if the feature or function 30 is not preinstalled on electronic control unit 57. The process for activating security access 49 of a certain electronic control unit 57 is standardized essentially according to ISO 14229. However, other specific mechanisms for original equipment manufacturers or highest-priority (tier 1) suppliers may prove to be suitable. It should be noted that cryptographic credentials for activating security access 49 of vehicle 21, stored on hardware security module 40, are accorded a high level of protection, since hardware security module 40 stores the complete credentials and therefore must be protected from unauthorized extraction.

Figure 3:
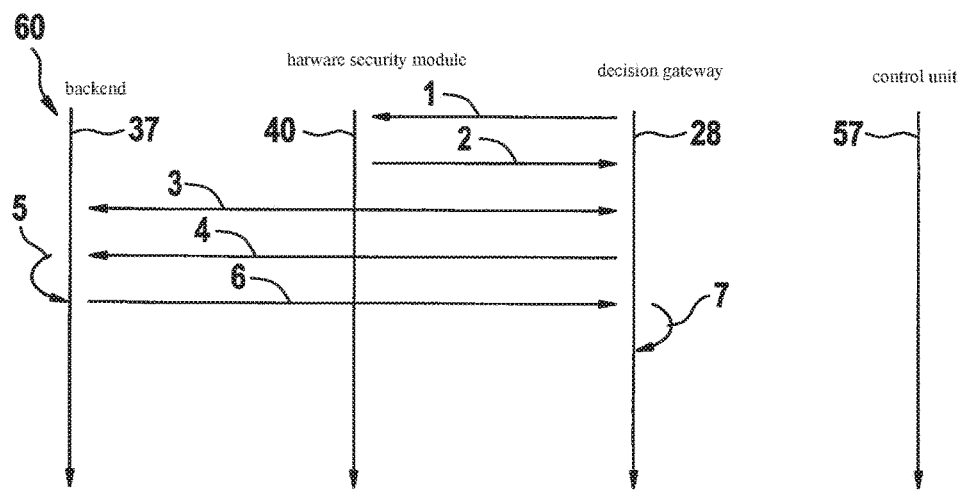
FIG. 3 shows the sequence diagram of an authorization method according to one specific embodiment.

The complete process is shown in FIG. 3, and includes the following steps:

Decision gateway 28 requests a certain function request 29 from hardware security module 40 and delivers an identifier $ID_{ECU}$ of electronic control unit 57 in step 1.

Hardware security module 40 generates a response in step 2 by signing function request 29 with a certain identity key $K_{HSM}^{-1}$ of hardware security module 40. The hardware security module generates the following message:

Request=(AlgParam, CommandParam,$N_1$, $ID_{ECU})K_{HSM}^{-1}$,CertK$_{HSM}$

In the above equation, "AlgParam" denotes algorithmic parameters, "CommandParam" denotes pieces of information concerning the executed command, such as function request 29, $N_1$ is a cryptographic random number and is used as a random number for ensuring "freshness," and hardware security module 40 returns function request 29 to decision gateway 28.

Decision gateway 28, based on $K_{DG}^{-1}$, Cert($K_{DG}$), and Cert($K_{backend}$), creates a safeguarded, mutually authenticated communication channel to backend 37, for example with the aid of TLS, in step 3.

Decision gateway 28 delivers function request 29 to backend 37 in step 4.

In step 5, backend 37 validates function request 29 based on Cert($K_{HSM}$), and confirms whether hardware security module 40 is a genuine hardware security module 40 which protects the necessary credentials for security access 49. When validation 5 succeeds, backend 37 generates a ticket 32 of the following form:

τ [sic]=(serialNo,$N_1$,$ID_{DG}$,$ID_{ECU}$,SW$_{version}$, SW$_{reference}$,run time)K$_{ticket}^{-1}$ Backend 37 delivers ticket 32 to decision gateway 28, with the aid of the safeguarded communication channel, in step 6. In addition, certificate Cert($K_{ticket}$) of ticket 32 may be transferred if it is not already stored in hardware security module 40 or decision gateway 28.

Decision gateway 28 stores ticket 32 in step 7 (no network is required for this step).

Two different architectures of decision gateway 28 may be used to carry out a secure feature activation, which is the subject matter of specific embodiments of the present invention. A first specific embodiment uses an internal hardware security module 40, and the second specific embodiment uses an external hardware security module 40. Additional security mechanisms on processor core 41 of the host computer, for example safeguarded start (bootstrap, boot), may likewise be used. Another, third specific embodiment does not use a hardware security module 40, and generated ticket 32 is not stored on decision gateway 28. However, this specific embodiment cannot ensure the security of the overall secure OTA update operation, since ticket 32 may be easily replayed via decision gateway 28.

Figure 4:
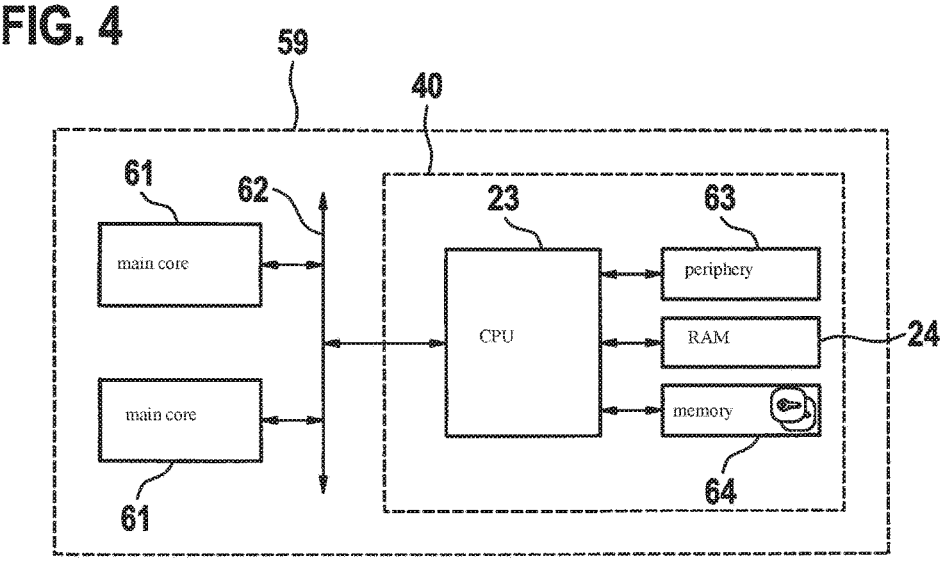
FIG. 4 shows the block diagram of a decision gateway based on an internal hardware security module.

FIG. 4 shows the first possible specific embodiment, whose architecture is based on an internal hardware security module 40 of decision gateway 28. A suitable environment is characterized by a one-chip system 59 (system on a chip, SOC) which includes multiple CPU cores utilized as main cores 61 and at least one CPU core 23, connected via a system bus 62, for the main functionality of the embedded software system. Hardware security module 40 is implemented as a subsystem on the same chip with the following key elements: communication with main cores 61 on the SoC bus, hardware shielding of the HSM functionality—examples include a CPU, nonvolatile memory 64, random access memory 24, and periphery 63—a CPU core 23 for the HSM functionality, separate from functionality on main cores 61, which allows a use of software functionality in a secure environment, and cryptographic credentials stored within a nonvolatile memory or read-only memory. The primary software functionality of decision gateway 28 is executed on main cores 61.

Figure 5:
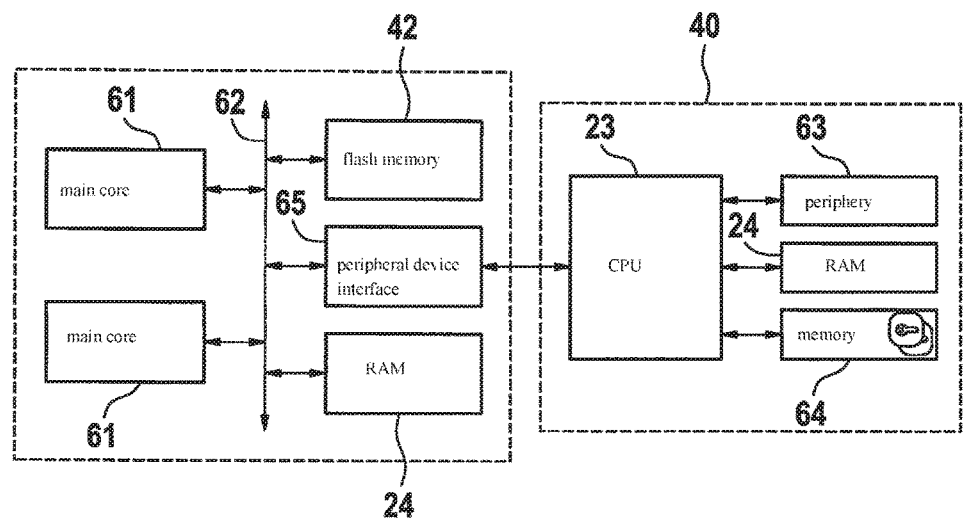
FIG. 5 shows the block diagram of a decision gateway based on an external hardware security module.

FIG. 5 shows the second possible specific embodiment, whose architecture is based on an external hardware security module 40 of decision gateway 28; examples include smart cards, and security controllers such as a chip card (universal integrated circuit card (UICC)) or trusted platform module (TPM). A suitable environment is characterized by a one-chip system which includes multiple CPU cores utilized as main cores 61, and at least one CPU core 23 for the main functionality of the embedded software system. Hardware security module 40 is implemented as an external component with the following key elements: communication with main core 61 via a peripheral device interface 65, such as a serial peripheral interface (SPI) 65, inter-integrated circuit ($I^2C$), or low pin count (LPC) interface, hardware shielding of the HSM functionality—examples include CPU, nonvolatile memory 64, random access memory 24, and periphery 63—a CPU core 23 for the HSM functionality, separate from functionality on main cores 61, which allows a use of software functionality in a secured environment, and cryptographic credentials stored within a nonvolatile memory or read-only memory. The primary software functionality of decision gateway 28 is executed on main cores 61. Security-critical software such as the validation of ticket 32 or security libraries is run on external hardware security module 40.

The second specific embodiment may use generally standard smart card devices against physical attacks on hardware security module 40, which are accorded a very high level of protection, in particular in comparison to the first specific embodiment. However, the communication channel between hardware security module 40 and the one-chip system may be problematic, since an attacker may easily intervene in this channel. To reduce the attacks on this communication channel, an additional cryptographic channel should be used in such a way that the data communication takes place only in an encrypted manner. The implementation of this channel is not important, and is not the subject matter of the present invention. If the communication channel is tunneled to electronic control unit 57, it has been found that applying a dedicated encryption channel between decision gateway 28 and the control unit is not necessary.

Figure 6:
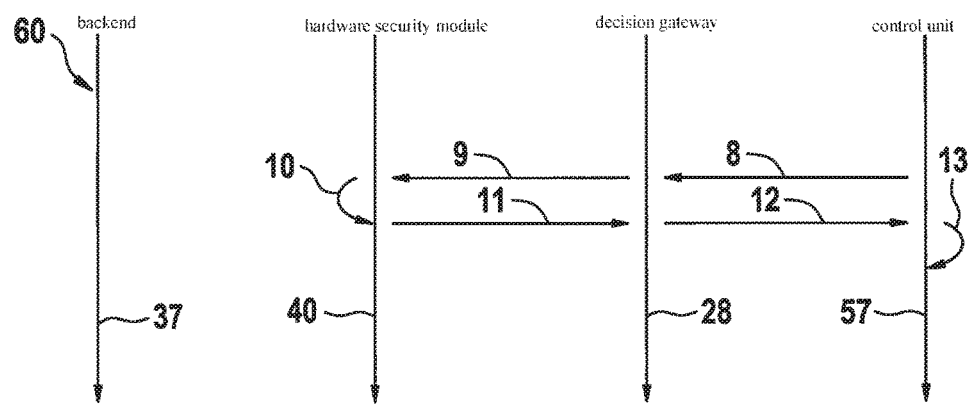
FIG. 6 shows the sequence diagram of a submethod for activating a preinstalled function.

An activation of function 30 may take place in particular with the aid of a preinstalled functional feature, as will be explained below with reference to FIG. 6. It is assumed here that a valid token (ticket 32) has been installed on decision gateway 28, and thus, the owner of a vehicle 21 has purchased a certain function 30 of an electronic control unit 57, and it is assumed that a certain control unit function 30 is already available on an electronic control unit 57. It is likewise assumed that an asymmetrical cryptosystem is used in which public key $K_{HSM}$ is applied in control unit 57, and hardware security module 40 stores resulting key pair ($K_{HSM}$, $K_{HSM}^{-1}$) made up of a private key and a public key. To activate a preinstalled functional feature which is not encrypted, the method is designed as follows:

Electronic control unit 57 requests 29 a certain ECU function 30 in step 8 by generating a random number that is used once (nonce), and requesting enabling of a certain function 30 in decision gateway 28 by requesting correct cryptographic key K for decrypting the software component. Sending a starting value or an authentication request $N_1$ in particular may be considered.

The starting value or authentication request $N_1$ in addition to ticket τ (32) and information $ID_{ECU}$ concerning requesting electronic control unit 57 are transmitted to hardware security module 40 in step 9.

Hardware security module 40 confirms in step 10 whether ticket 32 is valid; i.e., the following tests must be passed: the signature of ticket 32 is valid; the signature of $N_1$ ensures the "freshness" of ticket 32; $ID_{ECU}$ matches $ID_{ECU}$ stored in ticket 32; a check of $ID_{DG}$ shows that ticket 32 has not been replayed via another decision gateway 28; and a check of the internal database of all numbers already used once shows that $N_1$ has not yet been used. It should be noted that the numbers which are used once may be replaced by a strictly monotonic counter. In this case, hardware security module 40 manages a list of counters for each control unit, and increments the counter for each new ticket request. This has the effect that older counter values are invalidated.

If the above tests are successful, ticket 32 is invalidated by storing $N_1$ in an internal database of hardware security module 40 in which all invalidated tickets 32 are stored. It is pointed out that this database may also be managed outside hardware security module 40 if replay attacks may reliably be prevented by using synchronously running counters in the memory. After ticket 32 has been invalidated, hardware security module 40 responds with the correct starting value or the correct response with the aid of the cryptographic credential stored within hardware security module 40.

The response is delivered to decision gateway 28 in step 11.

The response is delivered to electronic control unit 57 in step 12.

The response is validated in step 13. For this purpose, electronic control unit 57 checks the signature, decrypts function 30, and utilizes function 30. It should be noted that if electronic control unit 57 loses its power supply or is restarted, software function 30 is no longer available and must be requested 29 anew.

Since it cannot be assumed that a malicious control unit will destroy cryptographic key K utilized for decrypting 13 a function 30, it is meaningful to activate a function 30 only once and to use it for an unlimited period of time.

If cryptographic session key K for decrypting the software component represented on electronic control unit 57 is intercepted by an attacker, he/she might be able to decrypt the functional feature on electronic control unit 57. To increase the security, hardware security module 40 may create a which is protected with respect to electronic control unit 57 and may also tunnel entire decision gateway 28. In this regard, it is noted that if an attacker were able to compromise electronic control unit 57, he/she could also request key K once in order to decrypt a functional feature and modify the software on electronic control unit 57 in such a way that the software uses the unencrypted functional feature.

Nevertheless, it is pointed out that if electronic control unit 57 uses internal flash memory 42 and other mechanisms (debugging password, no access according to IEEE Standard 1149.1) to prevent simple debugging on electronic control unit 57, this still represents a high hurdle for an attacker to modify the software on control unit 57. It is possible to use additional mechanisms such as a secure boot on electronic control unit 57 in order to additionally harden the device.

What is claimed is:

1. A method for authorizing a function of an embedded electronic control unit, comprising:
   requesting, by a decision gateway from a hardware security module, a function request for the function of the embedded electronic control unit;
   receiving, by the decision gateway from the hardware security module, the function request which is signed by the hardware security module using a secret key;
   creating, by the decision gateway, a communication channel, based on a cryptographic identity of the decision gateway, to a backend;
   sending, by the decision gateway, the signed function request to the backend;
   receiving, by the decision gateway from the backend via the communication channel a ticket which corresponds to the signed function request and is signed by the backend using a signature key;
   storing, by the decision gateway, the signed ticket; and
   activating the function of the embedded electronic unit based on the signed ticket.

2. The method as recited in claim 1, further comprising:
   receiving, by the decision gateway, an authentication request from the embedded electronic control unit;
   sending, by the decision gateway, the authentication request, in addition to the ticket and an identifier of the embedded electronic control unit, to the hardware security module;
   receiving, by the decision gateway from the hardware security module, a response to the authentication request, based on a validation of the ticket; and
   sending, by the decision gateway, the response to the embedded electronic control unit.

3. The method as recited in claim 2, wherein after sending the response, the embedded electronic control unit checks the signature, and, based on the checking, the embedded electronic control unit utilizes the function.

4. The method as recited in claim 3, wherein the decision gateway also sends to the embedded electronic control unit a cryptographic session key, and prior to utilizing the function, the embedded electronic control unit decrypts the function with the aid of the session key.

5. The method as recited in claim 1, wherein the cryptographic identity includes a secret key which is known only to the hardware security module, a public key associated with the secret key, and a certificate of the public key which is issued by a trusted entity, and which is a function of a system environment of the decision gateway.

6. The method as recited in claim 1, further comprising:
receiving, by the decision gateway, software in addition to the signed ticket, from the backend;
storing, by the decision gateway, the software;
initiating, by the decision gateway, a validation of the signed ticket and of the software;
checking, by the decision gateway, a result of the validation; and
installing, by the decision gateway, the software on the embedded electronic control unit based on the result.

7. The method as recited in claim 1, further comprising:
storing, by the decision gateway, a public key of the ticket, which is signed by the backend, wherein the validation of the ticket is carried out by the decision gateway with the aid of the public key.

8. The method as recited in claim 1, wherein the initiation of the validation includes an at least partial transfer of the ticket to the hardware security module, and the decision gateway receives the result of the validation from the hardware security module.

9. The method as recited in claim 1, wherein the ticket is received via an over-the-air interface.

10. The method as recited in claim 1, further comprising: using the activated function.

11. A non-transitory machine-readable memory medium storing a computer program for authorizing a function of an embedded electronic control unit, the computer program, when executed by a processor, causing the processor to perform:
requesting from a hardware security module a function request for the function of the embedded electronic control unit;
receiving from the hardware security module, the function request which is signed by the hardware security module using a secret key;
creating a communication channel, based on a cryptographic identity of the decision gateway, to a backend;
sending the signed function request to the backend;
receiving from the backend via the communication channel a ticket which corresponds to the signed function request and is signed by the backend using a signature key;
storing the signed ticket; and
activating the function of the embedded electronic unit based on the signed ticket.

12. The non-transitory machine readable medium as recited in claim 11, further comprising:
receiving, by the decision gateway, software in addition to the signed ticket, from the backend, the software being for implementing the function;
storing, by the decision gateway, the software;
initiating, by the decision gateway, a validation of the signed ticket and of the software;
checking, by the decision gateway, a result of the validation; and
installing, by the decision gateway, the software on the embedded electronic control unit based on the result.

13. The non-transitory machine readable memory medium as recited in claim 11, wherein the computer program further causing the processor to perform:
using the activated function.

14. A system comprising a decision gateway, an embedded electronic control unit, and a hardware security module, the decision gateway for authorizing a function of the embedded electronic control unit, the decision gateway configured to, when executed by a processor:
request from the hardware security module a function request for the function of the embedded electronic control unit;
receive from the hardware security module, the function request which is signed by the hardware security module using a secret key;
create a communication channel, based on a cryptographic identity of the decision gateway, to a backend;
send the signed function request to the backend;
receive from the backend via the communication channel a ticket which corresponds to the signed function request and is signed by the backend using a signature key;
storing the signed ticket; and
activating the function of the embedded electronic unit based on the signed ticket.

* * * * *